Nov. 30, 1926.  
D. C. DAUBMEYER  
1,608,493  
VERIFIER  
Filed May 11, 1925  4 Sheets-Sheet 2
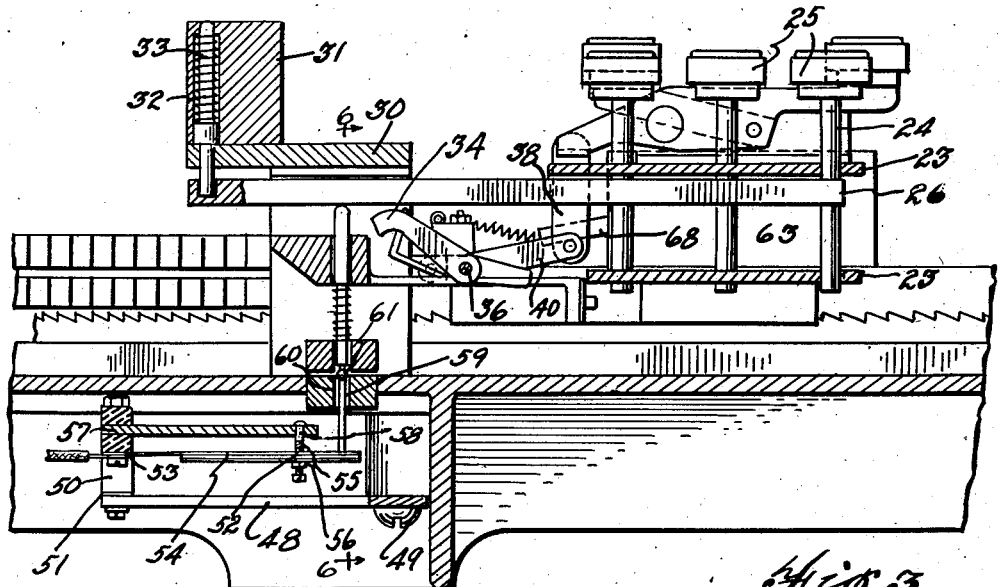
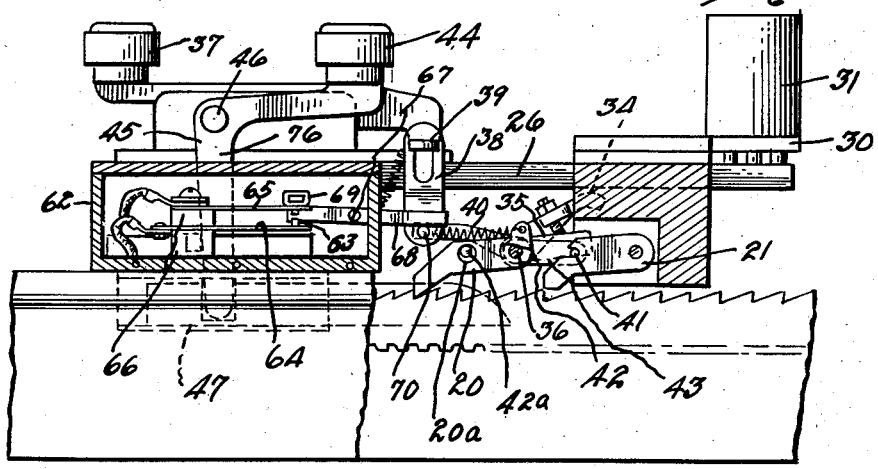
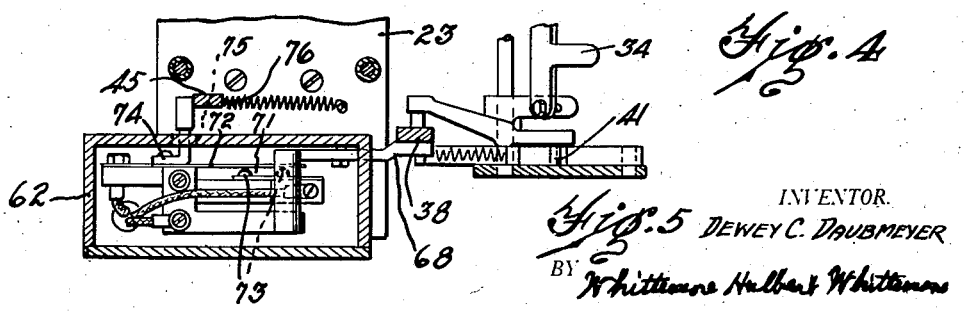
INVENTOR.
DEWEY C. DAUBMEYER
ATTORNEYS Nov. 30, 1926.

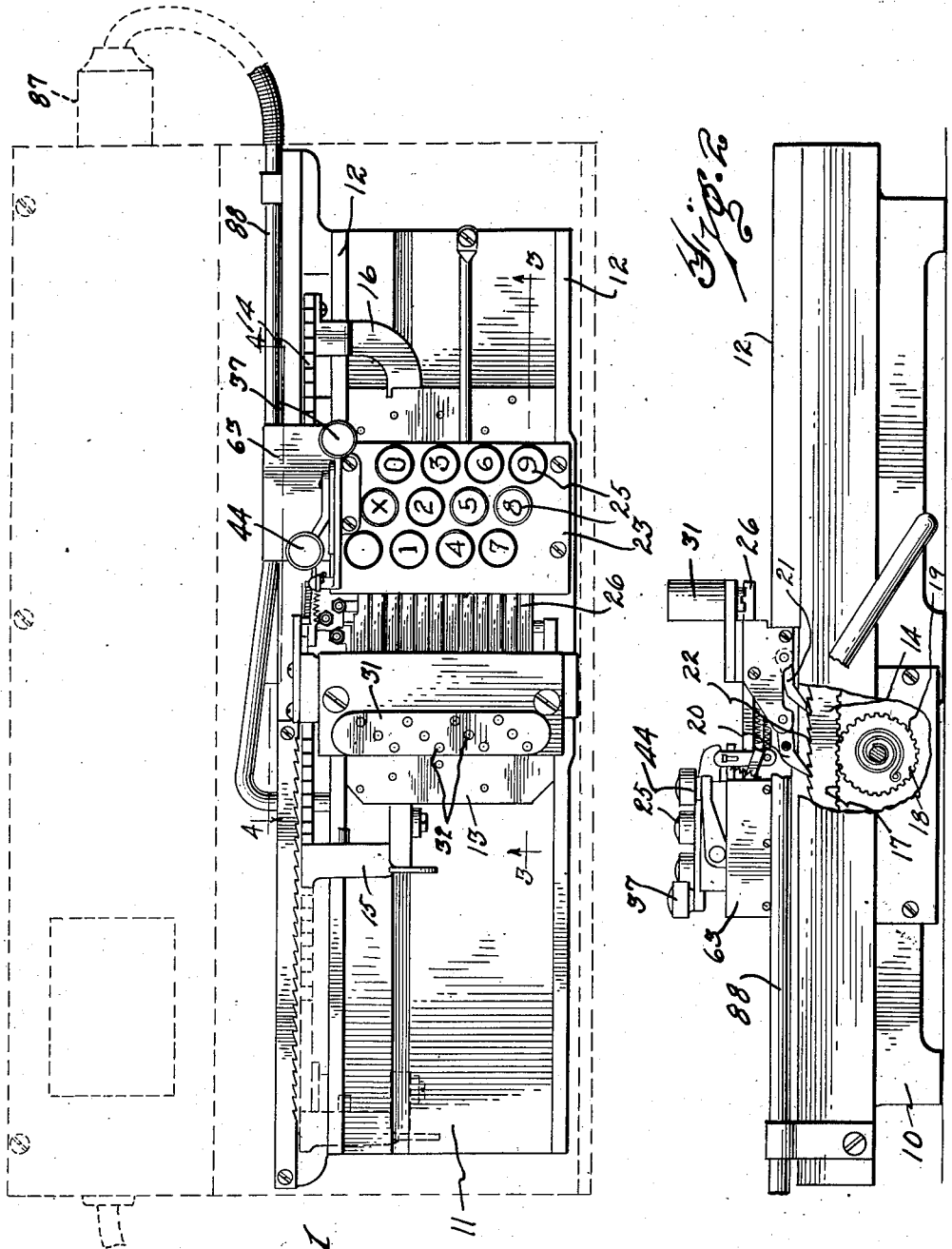

D. C. DAUBMEYER

VERIFIER

Filed May 11, 1925 4 Sheets-Sheet 3

INVENTOR.
DEWEY C. DAUBMEYER
BY Whittemore Hulbert Whittemore
+Belknap
ATTORNEYS Nov. 30, 1926.

D. C. DAUBMEYER 1,608,493

VERIFIER

Filed May 11, 1925     4 Sheets-Sheet 4

INVENTOR.
DEWEY C. DAUBMEYER

BY
Whittemore Hulbert Whittemore
+Belknap ATTORNEYS

Patented Nov. 30, 1926.

1,608,493

UNITED STATES PATENT OFFICE.

DEWEY C. DAUBMEYER, OF DETROIT, MICHIGAN.

VERIFIER.

Application filed May 11, 1925. Serial No. 29,551.

This invention relates to verifiers for tabulation cards such as shown in United States Letters Patent No. 1,266,768 and more particularly to improvements in devices of this character wherein the detection of errors may be facilitated by means of an easily noticeable signal. The invention finds particular utility in connection with the above type of machines through which cards are adapted to be fed, or for verifying the accuracy of perforations previously made.

One of the objects of the invention is to provide means for accurately and positively detecting all classes of errors which could be made during the original perforation of the cards; to detect these errors by an entirely automatic mechanism; and upon the detection of an error to cause the operation of a signal, preferably a visible signal, which will be maintained until recognition has been given thereto by a subsequent action by the operator.

The invention has also as an object to simplify, render more efficient, and improve generally, devices of this character, and the above as well as various other objects, advantages, and novel details of construction, will be made more apparent as this description proceeds, especially when considered in connection with the accompanying drawings, wherein—

Figure 6:
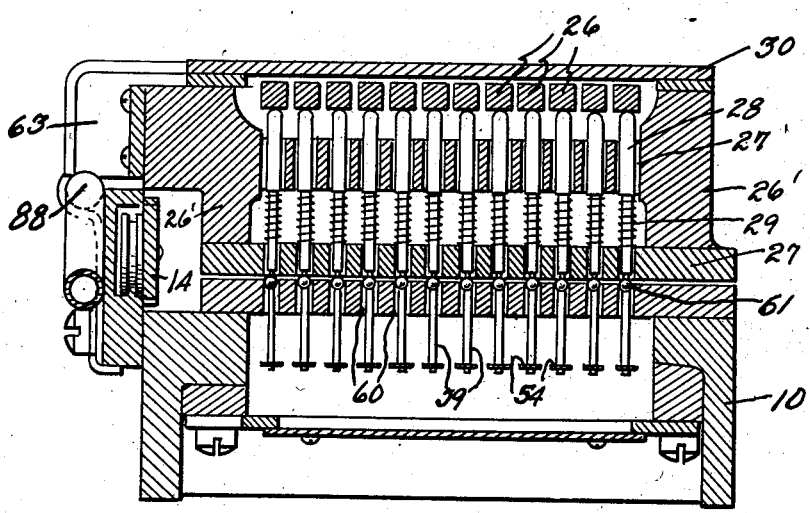
Figure 7:
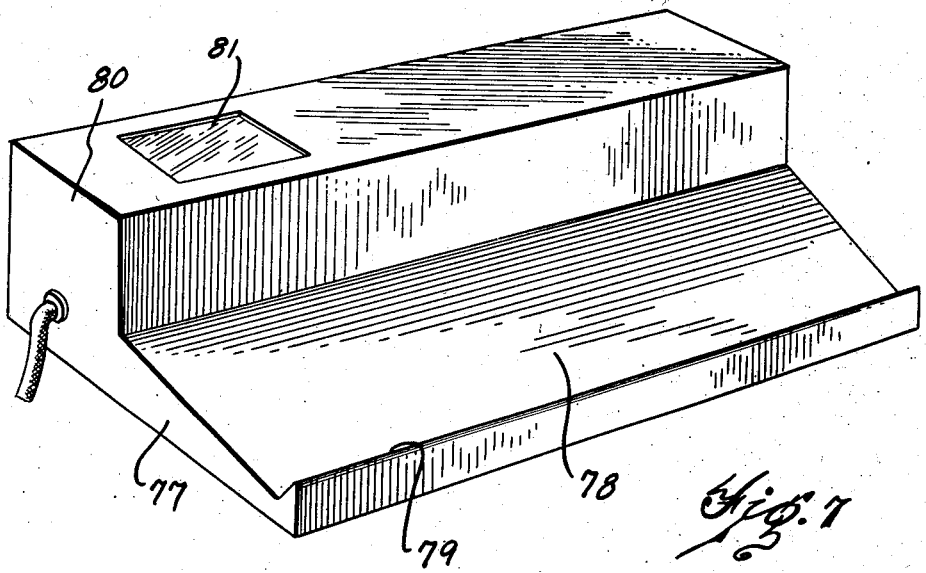
Figure 8:
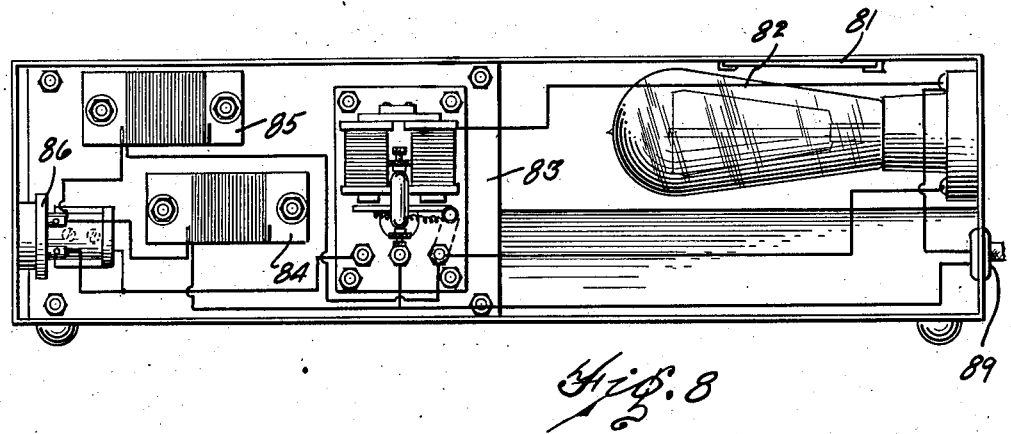
Figure 9:
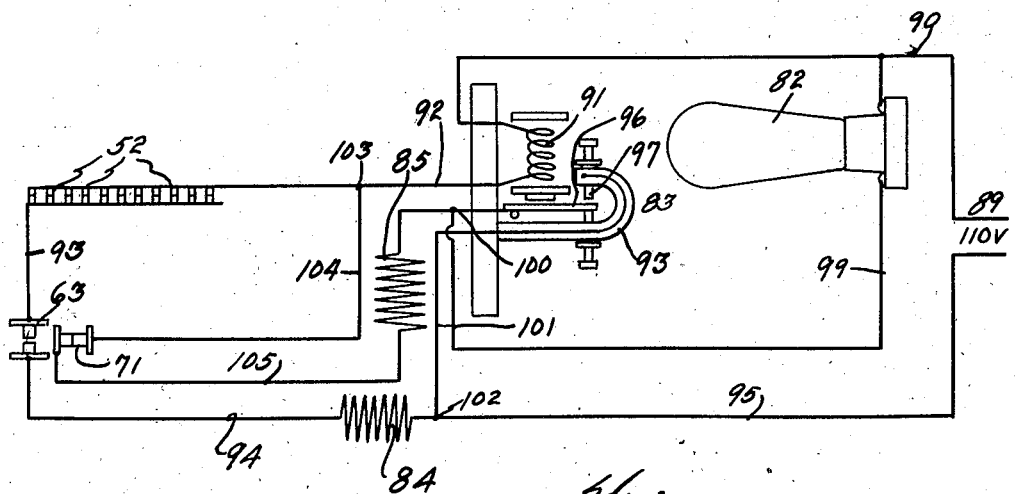

Figure 1 is a plan view of a verifier with my invention incorporated therein,

Figure 2 is a side elevation, partly in section, of the structure shown in Figure 1, Figure 3 is a sectional view taken substantially on the plane indicated by line 3—3 in Figure 1, Figure 4 is a fragmentary view partly in section and partly in side elevation, taken substantially on the plane indicated by line 4—4 in Figure 1, Figure 5 is a fragmentary top plan view showing certain details of construction, Figure 6 is a vertical transverse sectional view taken substantially on the plane indicated by the line 6—6 in Figure 3, Figure 7 is a perspective view of the stand or support for the verifier, Figure 8 is a rear elevation of this support with the back wall of the housing portion thereof removed, and Figure 9 is a diagrammatic view illustrative of the circuits involved in my invention.

Referring now particularly to the drawings wherein like reference characters indicate like parts, it will be noted that in Figures 1 and 2 wherein the verifier alone is illustrated, that this machine consists of a base 10 provided on its upper face with a guide way 11, the sides of which are defined by upstanding ribs or guide ledges 12. This guide way provides for the passing or feeding through the machine of perforated tabulation cards, one of which is illustrated at 13, the cards being fed longitudinally through the machine by means of a carriage which consists essentially of a rack bar 14 travelling in a suitable trackway at one side of the machine, and a pair of spaced arms 15 and 16 extending laterally therefrom and to a point within the trackway 11 and adapted to engage respectively the left and right hand ends of the card 13. At the outset the card carriage is positioned at the extreme left-hand end of the machine wherein the card is inserted between arms 15 and 16 and the carriage together with the card moved toward the right sufficient to bring the first left-hand row of perforations under the plungers of the verifying mechanism adapted to cooperate therewith. The card carriage, during the operation of the machine, is either held or advanced step by step, towards the left by a suitable escapement mechanism, yet to be referred to, or is released and is permitted to move to its position at the extreme left-hand end of the machine by a suitable carriage release mechanism yet to be referred to.

The rack bar 14 of the card carriage is provided at its lower edge with a plurality of teeth 17 adapted to be engaged by the pinion 18 of a carriage advancing mechanism, which pinion is rotatably urged in one direction by means of a spring 19. The escapement mechanism consists in part of pawls 20 and 21 alternately engageable with a rack of teeth 22 on bar 14. In practice the escapement mechanism is operated in the customary manner during the normal operation of the machine to permit a step by step movement of the card carriage toward the left, the escapement mechanism being operated either by the bank of main keys or by the spacing key while the escapement mechanism is completely released by a carriage release key to permit the card carriage to return to its extreme left-hand position.

Suitably supported on the base 10 of the machine is a pair of spaced plates 23 adapted to support a bank of keys, each key comprising a vertical stem 24 and a key head 25. The bank of keys 25 are suitably numbered. The stem 24 of each key engages one of a series of key bars 26 horizontally arranged and extending longitudinally of the machine.

Arranged transversely of the base and spaced from the bank of keys 25 is a superstructure including a pair of upright supporting members 26' and a pair of transversely arranged spaced guide bars 27 rigidly fixed to the uprights 26'. Supported by the guide bars 27 is a row of plungers 28, and arranged intermediate the guide bars 27 and surrounding each plunger is a spring 29 which tends to normally urge said plungers upwardly with the upper end of each plunger 28 engaging a corresponding key bar 26 and with its lower end arranged substantially flush with the under face of the lower guide bar 27.

Mounted preferably upon plate 30 which comprises a part of the aforesaid superstructure is a block or casing 31 within which is mounted a second series of vertical plungers 32, the lower ends of which are engageable with the rear ends of key bars 26. Plungers 32 are normally urged downwardly by coil springs 33. For reasons which will be made more apparent hereinafter springs 33 are relatively stronger than springs 29.

Extending transversely under the series of key bars 26 is an escapement rock bar 34 which is suitably connected by arms 35 to a rock shaft 36. A spacing key 37 is likewise connected to rock shaft 36 by means including a link 38 having a loose connection 39 with key 37 and a lever 40 connected to the link, to rock shaft 36, and to escapement pawl 21 as at 41. Escapement pawl 20 is connected to rock shaft 36 by lever 42.

Suitable means such as springs are provided for maintaining the parts substantially in the position shown in Figure 4, it being understood that only those parts of the escapement mechanism which are essential to an understanding of the operation of this invention have been described and illustrated. It will be seen that escapement rock bar 34 is normally just below key bars 26 while escapement pawl 20 is in engagement with teeth 22 and escapement pawl 21 is out of engagement.

In operation when one of the bank of keys 25 is depressed the corresponding key bar 26 is depressed thereby rotating rock shaft 36 by the engagement of key bar 26 with escapement rock bar 34. This movement of the parts raises escapement pawl 20 and at the same time depresses pawl 21 owing to the connection between these pawls and arms 42 and 43 extending in opposite directions from shaft 36. When the depressed key 25 is released the parts will be returned to their normal position by the various springs associated therewith and pawl 20 will be again moved into engagement with teeth 22 while pawl 21 is raised, whereupon the card carriage will have moved to the left one space. The same movement of the card carriage results from a depression of the spacing key 37 which acts on the escapement mechanism through link 38.

Also associated with the bank of keys is a carriage release key 44 which includes as a part thereof a bell crank lever 45 pivoted to a support secured to the key bank frame as at 46. The lower end of the lever 45 engages a carriage release mechanism indicated generally by the reference character 47. In practice a depression of key 44 rocks lever 45 to actuate carriage release mechanism 47 whereby escapement pawls 20 and 21 are released to permit a return of the card carriage to its extreme left-hand position.

In the operation of the machine as described thus far the depression of any key 25 has caused a depression of key bar 26, which pivoting upon the end of corresponding plunger 32 and functioning as a lever of the second class, has caused a depression of the corresponding plunger 28. The parts function in this manner when a key is depressed which corresponds to the perforation previously formed in the card 13, or in other words, when a perforation is arranged under the depressed plunger 28. Consequently the depressed plunger 28 enters the previously formed perforation in card 13 and descends therethrough, whereupon the escapement mechanism is actuated by the depressed key bar 26, and upon the release of the depressed key the card carriage moves one space. If, however, there is an error either in pressing a proper key 25 or in the location of perforation in the card 13 the plunger thus depressed fails to register with the perforation in the card and the imperforate portion of the card encountered by the plunger resists depression of the latter and the said plunger then becomes a fulcrum for the actuated key bar upon which the latter now functioning as a lever of the first class, pivots to raise a corresponding plunger 32 in opposition to restraining spring 33. Because of the shortening of the leverage occasioned by this change of the fulcrum, the rock bar 34 is not depressed sufficiently to operate the escapement mechanism and the carriage is consequently not advanced.

The structure hereinbefore described constitutes the essential mechanism of the verifier with which my invention is adapted to be associated. No claim is made to the hereinbefore described structure except in so far as its operation affects the operation of my invention.

In the operation of the verifier as just pointed out, it is necessary for the operator to detect the errors by observing the failure of the card carriage to advance, which occurs either when an incorrect key is depressed or when an incorrect perforation has been made in the card. The rapidity with which these machines are operated makes it extremely difficult for the operator to observe even when such error has been detected by the verifier. Furthermore, there are various classes of errors which have become common in record cards of this nature which are difficult, if not impossible, of detection by by the verifier construction herein described. Notable among these is that error which consists in two perforations in a single vertical column, one of which may however be correct, this error being particularly troublesome when the incorrect error is for instance, further toward the bottom of the card and represents a value higher than the correct one. Another type of error which has been difficult of detection in the heretofore known type of verifier has been the errors occurring in the last column, the difficulty resulting from the failure of the carriage to advance even when the correct key has been depressed.

My invention therefore is designed with particular reference to improving the efficiency of the verifier so that it will positively and accurately detect all types of errors and will furthermore cause the display of a signal which will remain on even though the the operation of the machine is continued, it being possible to reset the signal only upon a resetting of the machine pursuant to locating positively the error.

In carrying out my invention I associate with the row of plungers 28 a series of contact switches 52 equal in number to the number of data figures contained in a vertical row on the card, and consequently equal to the number of plungers 28. This series of contacts is supported upon a frame 48 which is in the form of a rigid plate suitably connected to the under side of the base of the machine, as for instance by means of bolts 49. Spaced from the base plate 48 by means of a spacing block 50 and an insulating strip 51 is the series of switches 52 comprising a contact member in the form of a comb, one edge portion 53 thereof being continuous and serving as the securing portion for the comb, while the projecting portion consists of a plurality of projecting fingers 54 each carrying a contact 55 rendered adjustable by lock nuts 56. Spaced from contact member 52 and insulated therefrom is a rigid contact plate 57 which carries a plurality of contacts 58 equal in number to contacts 55 and adapted for engagement therewith. The free end of each finger 54 of contact comb 52 is provided with an upwardly projecting stud or pin 59 which extends upwardly through an aligned opening 60 in the base of the machine. Arranged in each opening 60 and engaging the end of the corresponding pin 59 is a ball 61. The fingers of contact comb 52 are inherently resilient and tend normally to urge pins 59 and balls 61 upwardly whereby the ball 61 projects slightly above the top surface of base 10 and engages the lower ends of plungers 28. This is the normal position of the parts, and as shown the contacts 55 and 58 are therefore normally engaging one another. When a card 13 is inserted into the machine it is forced between the lower ends of plungers 28 and balls 61, the thickness of the card being sufficient to depress balls 61 flush with the upper surface of base 10, this downward displacement of balls 61 and pins 59, moving the teeth or fingers 54 of comb 52 downwardly so as to break contacts 55—58. All of the contacts are broken save those corresponding to the perforations in the card. The registration of a perforation in card 13 with one of the balls 61 permits this ball to project through the perforation, whereupon the corresponding pair of contacts 55—58 are permitted to engage so that a circuit, later to be described, is closed through this pair of contacts.

By referring now more particularly to Figures 3, 4, and 5, a pair of switches which cooperate with the above described switches will be explained. Secured to the base of the machine immediately adjacent the bank of keys is a switch box 62. Arranged within this box is a secondary or delayed action switch 63 which consists of a pair of contact members 64 and 65 mounted in spaced parallel relation and suitably insulated and spaced from one another by insulating blocks 66. This secondary or delayed action switch is adapted to be operated during the latter part of the depression of any one of the bank of keys 25 or upon a depression of spacing key 37. For this purpose I pivotally mount on the switch box 62 as at 67 a lever 68 having a laterally projecting insulated arm 69 which extends over the free end of upper spring contact member 65. The opposite end of lever 68 extends through a slot in the wall of switch box 62 and engages a pin 70 extending laterally from the point of connection of link 38 and arm 40. Lever 68 rests on top of the pin 70 and inasmuch as pin 70 is reciprocated vertically during an operation of the escapement mechanism effected either during the latter part of the depression of one of the bank of keys 25 or upon operation of key 37, lever 68 will be rocked about its pivot 67 to effect a closing of switch 63 by arm 69. The closing of switch 63 is delayed with reference to the sequence of operations or, in other words, is subsequent to the operation of switches 55—58. Upon the initial depression of key 25 a corresponding plunger 28 will be depressed and if this plunger corresponds to the perforation of card 13 the plunger will descend through this registering perforation to open the correspondingly closed contacts 55—58 of switch 52, and during the continued movement of key 25 switch 63 will be closed. This movement of switch 63 will, however, be an idle movement as the circuit will be incomplete owing to the previous opening of switch 52. However, if a plunger 28 is depressed which does not correspond to the perforation in card 13 the pair of contacts 55—58 of switch 52 closed by reason of the perforations will not be opened, and consequently during a continued depression of the aforesaid key, delayed action switch 63 will be closed and a circuit completed thereby.

It should be understood that while the escapement mechanism completes a full operation only when a key, corresponding to an accurate perforation, is depressed that a sufficient rocking of arm 40 and reciprocation of pin 70 occurs each time to actuate arm 68. This movement of arm 40 independent of pawl 20 is possible because of the loose connection between these parts which consists of a pin 42ª carried by arm 42 and the relatively large coöperating aperture 20ª in pawl 20. Furthermore in the following description and in the claims the escapement pawls 20 and 21, rock bar 34, the spacing key 37, and the cooperating connecting levers and shafts are all referred to as the carriage or card advancing means. This mechanism has been described and is referred to generally as it is of standard construction and forms no part of this invention.

Also contained within switch box 62 is a switch 71 which consists essentially of a spring contact member 72 adapted to engage contacts 73, these parts being suitably supported and insulated from one another and from switch box 62 by blocks of insulation. Rigidly secured to spring contact member 72 is an arm 74 which extends laterally therefrom and through an aperture 75 in the switch box. This arm 74 extends into the path of the downwardly extending leg 76 of bell crank lever 45 of carriage release key 44. Spring contact member 72 which is inherently resilient normally bears against contact 73 so that this switch is normally closed. However, upon a depression of carriage release key 44, which as heretofore described operates a suitable carriage release mechanism 47, bell crank lever 45 is rocked, thus moving the leg 76 thereof to the left as seen in Figure 4, and by reason of engagement of this element with arm 74 the arm is is also moved toward the left and swings contact member 72 away from contact 73, thus opening switch 71.

By reference to Figures 7 and 8 it will be noted that I have provided a stand or support for the verifier machine proper, which support constitutes also a housing for that portion of the mechanism not carried directly by the verifier.

As will be noted in Figure 7 the stand 77 is formed with an upwardly and rearwardly inclined supporting platform or base 78 arranged preferably with an upwardly projecting forward ledge 79. The verifier is adapted to rest upon this supporting platform 78 and by reason of its inclination will be properly inclined for convenient operation. The supporting platform merges into an enlarged housing 80, the rear side of which may be opened and closed by a suitable cover whereby access to the interior thereof may be had.

The upper wall of the housing is preferably cut away and the aperture thus formed is closed by a sheet of transparent material 81 such as glass or the like, preferably distinctively colored. Arranged within the housing adjacent this aperture, is an electric light bulb 82. This electric light bulb is capable of receiving 110 volts whereby the device may be connected to an ordinary lighting circuit. Also mounted within the housing is a relay 83, a pair of resistance elements 84 and 85, and a four-way plug 86 which extends through the casing at one end thereof and is adapted to be engaged by a four-way prong plug 87, in which the electric wires from the parts of the device carried on the verifier terminate. These wires on the verifier are preferably carried in conduit 88. Wires 89 enter housing 80 preferably at the end at which electric light bulb 82 is located and are connected to a suitable source of power, preferably the ordinary electric light house circuit.

Referring to Figure 9, wherein the electrical circuits involved in the invention are diagrammatically illustrated, the operation of the device will be described.

In a normal operation of the verifier the card 13 is fed longitudinally of the machine and the vertical rows of data, selected items of which are punched, are successively brought in alignment with plungers 28 and consequently balls 61. Assume that in the row now in alignment with plungers 28 a properly arranged perforation has permitted a ball 61 to project upwardly therethrough a distance sufficient to close the corresponding contacts 55—58 of switch 52. The circuit, however, is not complete as delayed action switch 63, also included in the switch, has not as yet been closed. Upon a depression of the proper key 25 of the bank of keys plunger 28 will be depressed and because of its registration with the aperture in card 13 will depress ball 61, and through pin 59 will move the corresponding spring finger 54 downwardly, thereby separating the pair of contacts 55—58 of the contact switch 52. During the continued movement of this key 25 contact 63 is subsequently closed, this latter switch closing, however, only after switch 52 has been opened. Hence the circuit was never completed but the operation of the key 25 has actuated the escapement mechanism and the card carriage has advanced one step, thereby positioning the next vertical row in alignment with plungers 28.

Assume that now either an incorrect key 25 is depressed or else that an incorrect perforation appears in the column in alignment with plungers 28. One of the switches 52 will consequently be closed and upon a depression of a key 25 the corresponding plunger 28 will engage an imperforate portion of the card and the key bar 26 will pivot on this plunger and raise plunger 32. During the continued movement of the key it has, however, closed contact switch 63 and inasmuch as switch 52 in the circuit has not been opened, the following circuit is made active. From the positive side of the source of power 89 through wire 90 to the coil 91 of the relay, through the coil and through wire 92, across closed switch 52, through wire 93, across switch 63, through wire 94 and resistance element 84, and thence through wire 95 back to the source of power. This causes an energization of coil 91 of relay 83, whereupon armature 96 is attracted and caused to engage contact 97 carried by the goose-neck frame 98 of the relay.

The relay 83 is designed to control a circuit including electric light bulb 82, this circuit excluding the two resistant elements 84 and 85 so that a 110 volt bulb may be employed. Therefore upon the energization of coil 91 of relay 83 the following circuit is excited: from the source of power 89 through wire 90, through electric light bulb 82, through wire 99 to point 100, thence through armature 96, contact 97, relay frame 98, thence through wire 101 to point 102, and thence through wire 95 to the source of power. Consequently electric light bulb 82 is illuminated, thereby producing a visible signal indicating that an error has been detected by the machine.

The relay is maintained energized and this circuit closed irrespective of the opening of switch 63 by a release of the depressed key by the following circuit which is closed upon the initial energization of the relay: from the source of power through wire 90, through coil 91 of the relay, through wire 92 to point 103, thence through wire 104 to normally closed switch 71, then through wire 105, resistance 85, through armature 96, contact 97, relay frame 98, wire 101, and wire 95 back to the source of power.

As was heretofore pointed out, switch 71, which is normally closed, is adapted to be opened by depression of carriage release key 44. Consequently when an error has been detected and indicated by the illumination of electric light bulb 82, this signal will be maintained until switch 71 is opened and this switch may only be opened by a depression of the carriage release key, whereupon the carriage will be moved back to its point of rest at the left-hand end of the machine. Simultaneously the last mentioned circuit designed to maintain the coil 91 of the relay excited is broken. Consequently armature 96 moves away from engagement with contact 97 whereby the circuit to electric light bulb 82 is broken, and the circuits are in their initial or de-energized state.

In view of the foregoing it will be readily apparent that errors of any character whatsoever will be readily detected. One of the switches 52 will be closed for each perforation in a vertical column and if these perforations are inaccurately placed or if there be more than the correct number of perforations, the switches 52 thus closed will not be opened by depression of the selected keys 25. Consequently during the subsequent operation the depression of any of the keys will cause the closing of switch 63 and an energization of the relay circuit. The relay thereupon closes an independent circuit which includes the signal light and also closes a shunt circuit including the coil of the relay for maintaining this relay energized until this latter circuit is deliberately broken by a subsequent operation. Hence the operator must take cognizance of the error as indicated by the signal light, which will remain illuminated despite an effort to continue the operation of the verifier.

Obviously the device will function and the signal will be illuminated even upon an erroneous depression of spacing key 37, because in such an event one of the switches 52 will be closed and will not be opened upon a depression of key 37, but the movement of this key will reciprocate link 38 thereby actuating arm 68 to close switch 63, whereupon the circuits will be excited in the manner hereinbefore pointed out.

A notable feature of the herein described arrangement consists in the structural design thereof, which enables the device to be associated with a standard verifier of the character referred to without material alteration thereto. In fact the design of the parts of this invention are such that the parts carried directly by the verifier may be attached thereto by utilizing spaces and bolt apertures already on the machine. Furthermore, the construction and arrangement of this invention is such that it does not alter or affect the operation of the verifier as originally designed but, on the contrary, efficiently cooperates therewith to produce an added efficiency of operation and more potent results.

The combined support and housing herein shown is designed to provide a convenient support and platform for the machine as well as a casing for enclosing the signal light, relay, resistance elements and the wiring therefor. However, while these elements have been shown as arranged within the housing 80 it will be readily understood that the invention should in no wise be limited by this disclosure, as these parts may be all contained in any sort of housing associated with a support for the machine, or in a disassociated relation.

Therefore, while one illustrative embodiment of the invention has been described and shown in some detail the invention should not be limited by the disclosure as reservation is made to make such changes in the construction, arrangement and association of parts, as may come within the purview of the accompanying claims.

What I claim as my invention is:

1. In an error indicator for indicating errors in a perforated sheet, a signal circuit, and means normally restrained by the imperforate portion of the sheet and operable by the presence of perforations in said sheet for initiating the completion of said circuit.

2. In an error indicator, the combination with means for advancing a perforated sheet, of a signal circuit, and means normally restrained by the imperforate portion of the sheet and operable by the presence of a perforation in said sheet, and by said advancing means, for energizing said circuit.

3. In an error indicator for indicating errors in a perforated sheet, a signal, means normally restrained by the imperforate portion of the sheet and operable by the presence of perforations in said sheet for initiating the operation of said signal, and means controlled by the further operation of the perforation detector and subsequently operated for completing the operation of said signal.

4. In an error indicator, the combination with means for advancing a perforated sheet, of a signal circuit, and means normally restrained by the imperforate portion of the sheet and actuated by the presence of perforations in the sheet and said advance ing means acting in sequence and separately operable for energizing said circuit.

5. In an error indicator, the combination with means for advancing a perforated sheet, of a signal circuit, and means normally restrained by the imperforate portion of the sheet and actuated by the presence of perforations in the sheet and said advancing means acting in delayed sequence for energizing said circuit.

6. In an error indicator, the combination with means for advancing a perforated sheet, of a signal circuit, means normally restrained by the imperforate portion of the sheet and operable initially by the inaccurate presence of a perforation in said sheet and by the advancing means, for energizing said circuit.

7. In an error indicator, the combination with means for advancing the same, of a signal circuit, means normally restrained by the imperforate portion of the sheet and operable initially by the inaccurate presence of a perforation in said sheet, and subsequently by the advancing means, for energizing the said circuit.

8. In an error indicator, the combination with means for advancing a perforated sheet, and means engageable in the perforations for verifying the accuracy of the same, of a signal circuit, and means normally restrained by the imperforate portion of the sheet and operable by the presence of an inaccurate perforation, for initially closing said circuit.

9. In an error indicator, the combination with means for advancing a perforated sheet, and means engageable in the perforations for verifying the accuracy of the same, of a signal circuit, and means controlled by the presence of a perforation for initiating the closing of said circuit, said means being adapted for engagement by said perforation engaging means.

10. In an error indicator, the combination with means for advancing a perforated sheet, and means engageable in the perforations for verifying the accuracy of the same, of a signal circuit, and means controlled by the presence of a perforation for initiating the closing of said circuit, said means being moved to open circuit position when the controlling perforation is engaged by said verifying means.

11. In a verifying machine, the combination with means for advancing a perforated sheet, of a signal circuit, a plurality of successively operated switches for closing said circuit, means operable in dependence upon the presence of perforations for initiating the closing of said circuit, and means operable by said sheet advancing means for completing the closing of said circuit.

12. In a verifying machine, the combination with means for advancing a perforated sheet, and means engageable in the perforations for verifying the same, of a signal circuit, a plurality of successively operated switches for closing said circuit, means operable in dependence upon the presence of perforations for initiating the closing of said circuit, and means operable by said sheet advancing means for completing the closing of said circuit, said perforation engaging means functioning upon the presence of accurate perforations for interrupting the action of said initially operating means.

13. In a verifier, the combination with means for advancing a perforated card, and a plurality of plungers engageable in the perforations of the card for verifying the accuracy of the same, of a signal circuit, means operable in dependence upon the presence of perforations for initating the closing of said circuit, and means operable by said sheet advancing means for completing the closing of said circuit.

14. In a verifier, the combination with means for advancing a perforated card, and a plurality of plungers engageable in the perforations of the card for verifying the accuracy of the same, of a signal circuit, means operable in dependence upon the presence of perforations for initiating the closing of said circuit, and means operable by said card advancing means, and functioning during the latter part of its operation, for completing the closing of said circuit.

15. In a verifier, the combination with means for advancing a perforated card, and a plurality of plungers engageable in the perforations of the card for verifying the accuracy of the same, of a signal circuit, means operable in dependence upon the presence of perforations for initiating the closing of said circuit, and means operating in delayed sequence and controlled by said card advancing means for completing the closing of said circuit.

16. In a verifier, the combination with means for advancing a perforated card, and a plurality of plungers engageable in the perforations of the card for verifying the accuracy of the same, of a signal circuit, means controlled by the presence of perforations in said card for initiating the closing of said circuit, and means operating in delayed sequence for completing the closing of said circuit, the plungers engaging the accurate perforations functioning to interrupt the operation of said initial circuit closing means.

17. In a verifier, the combination with means for advancing a perforated sheet, and a plurality of plungers engageable in the perforations of the sheet for verifying the accuracy of the same, of a signal circuit, and a switch in said circuit including a plurality of contacts operable in dependence upon the presence of perforations, said plungers functioning to open those contacts closed by reason of the accurate perforations.

18. In a verifier, the combination with means for advancing a perforated sheet, and a plurality of plungers engageable in the perforations of the sheet for verifying the accuracy of the same, of a signal circuit, a switch in said circuit including a plurality of contacts operable in dependence upon the presence of perforations, said plungers functioning to open those contacts closed by reason of the accurate perforations, and a second switch in said circuit operable to complete said signal circuit.

19. In a verifier, the combination with means for advancing a perforated sheet, and a plurality of plungers engageable in the perforations of the sheet for verifying the accuracy of the same, of a signal circuit, a switch in said circuit including a plurality of contacts operable in dependence upon the presence of perforations, said plungers functioning to open those contacts closed by reason of the accurate perforations, and a second switch operable by said sheet advancing means for completing said signal circuit.

20. In a verifier, the combination with means for advancing a perforated sheet, and a plurality of plungers engageable in the perforations of the sheet for verifying the accuracy of the same, of a signal circuit, a switch in said circuit including a plurality of contacts operable in dependence upon the presence of perforations, said plungers functioning to open those contacts closed by reason of the accurate perforations, and a second switch operable in delayed sequence by said sheet advancing means for completing said signal circuit.

21. In a verifier, the combination with means for advancing a perforated sheet, and a plurality of plungers engageable in the perforations of the sheet for verifying the accuracy of the same, of a signal circuit, a switch in said circuit including a plurality of contacts, means engageable in said perforations for closing a number of contacts equal to the perforations, the contacts closed by the presence of accurate perforations being opened by the engagement of the plungers with the corresponding contact operating means, and a delayed action switch for completing said signal circuit.

22. In a verifier, the combination with means for advancing a perforated sheet, and a plurality of plungers engageable in the perforations of the sheet for verifying the accuracy of the same, of a signal circuit, a switch in said circuit including a plurality of contacts, means engageable in said perforations for closing a number of contacts equal to the perforations, the contacts closed by the presence of accurate perforations being opened by the engagement of the plungers with the corresponding contact operating means, and a switch operated in delayed sequence for completing said signal circuit.

23. In a verifier, the combination with means for advancing a perforated sheet, and a plurality of plungers engageable in the perforations of the sheet for verifying the accuracy of the same, of a signal circuit, a switch in said circuit including a plurality of contacts, means engageable in said perforations for closing a number of contacts equal to the perforations, the contacts closed by the presence of accurate perforations being opened by the engagement of the plungers with the corresponding contact operating means, and a second switch operated in delayed sequence by the sheet advancing means for completing said signal circuit.

24. In a verifier, the combination, with means including a carriage for advancing a perforated sheet, and a carriage release key, of a signal circuit including a relay for prolonging the energization of said signal circuit, means operable by the presence of an inaccurate perforation and by the sheet advancing means for initially closing said circuit, and means operable by said carriage release key for interrupting the circuit to said relay.

25. In a verifier, the combination, with means including a carriage for advancing a perforated sheet, and a carriage release key, of a signal circuit including, a relay, a subcircuit closed by said relay, a signal in said sub-circuit, and a shunt circuit also including said relay and closed by said relay, means operable by the presence of inaccurate perforations and by the sheet advancing means for momentarily closing said first circuit, and a switch in said shunt circuit and opened by operating said carriage release key for de-energizing said relay.

26. In a verifier, the combination, with means including a carriage for advancing a perforated sheet, and a carriage release key, of a signal circuit including, a relay, a subcircuit closed by said relay, a signal in said subcircuit, and a shunt circuit also including said relay and closed by said relay, means operable by the presence of inaccurate perforations and by the sheet advancing means for momentarily closing said first circuit, and a switch in said shunt circuit and opened by operating said carriage release key for de-energizing said relay, said first circuit and shunt circuit containing resistance elements, as and for the purpose described.

27. In an arrangement of the class described, the combination with a verifier and an error signal system including, a signal, resistance elements, and a relay, of a member provided with an inclined platform for said verifier, and a housing adapted to contain said signal, resistance elements and relay and a window formed therein through which said signal is visible.

28. In an error indicator, the combination with means for advancing a perforated sheet, and means engageable in the perforations for verifying the accuracy of the same, of a signal and a delayed sequence actuating means therefor operating in dependence upon perforations in the sheet and the sheet advancing means, the first of said means being rendered inoperative when said verifying means engages a correct perforation.

In testimony whereof I affix my signature.

DEWEY C. DAUBMEYER.